C. H. WILLARD.
AUTOMOBILE WHEEL AND AXLE.
APPLICATION FILED FEB. 11, 1911.
1,034,378.
Patented July 30, 1912.
2 SHEETS—SHEET 1.
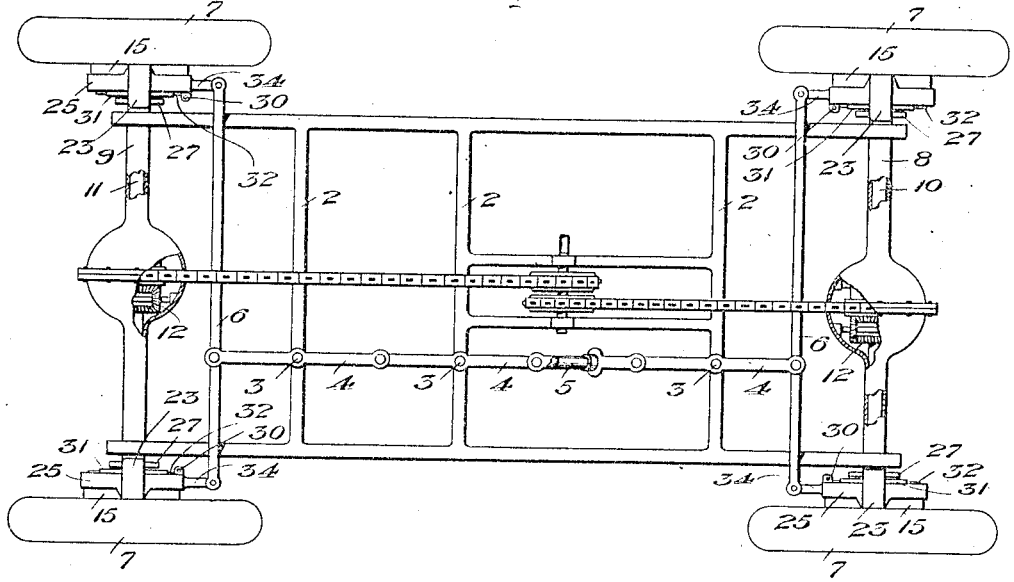
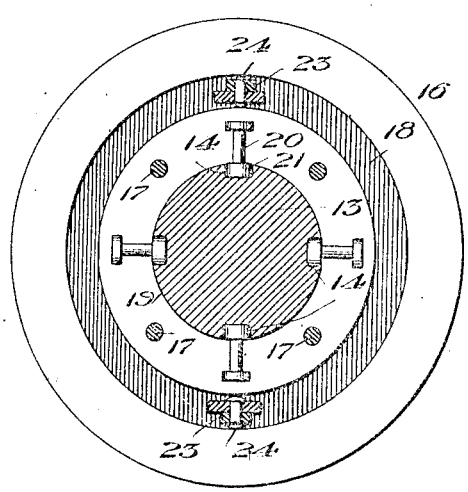
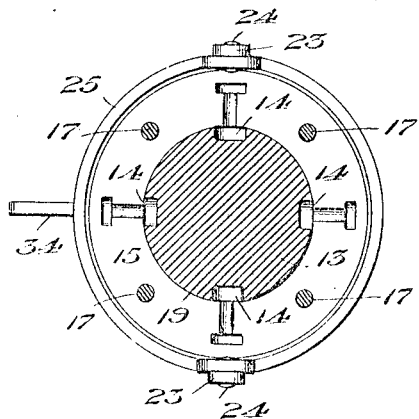

C. H. WILLARD.
AUTOMOBILE WHEEL AND AXLE.
APPLICATION FILED FEB. 11, 1911.
1,034,378.
Patented July 30, 1912.
2 SHEETS—SHEET 2.
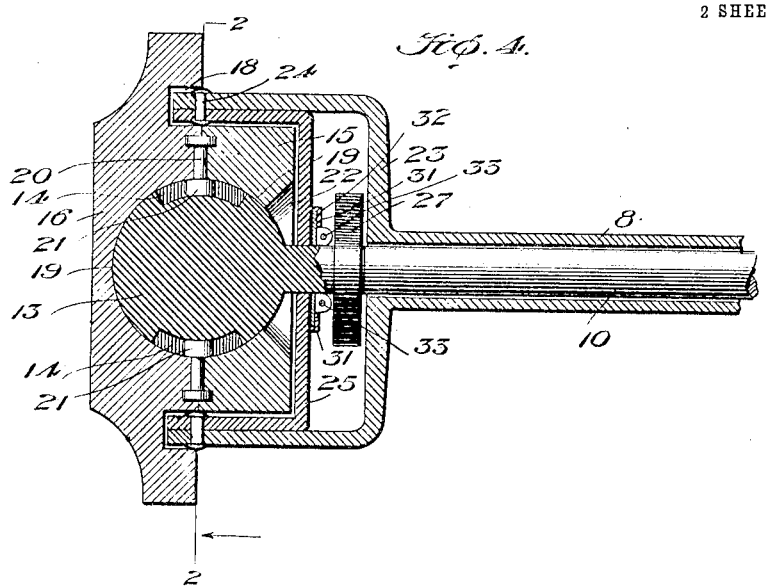
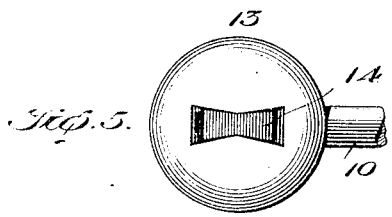
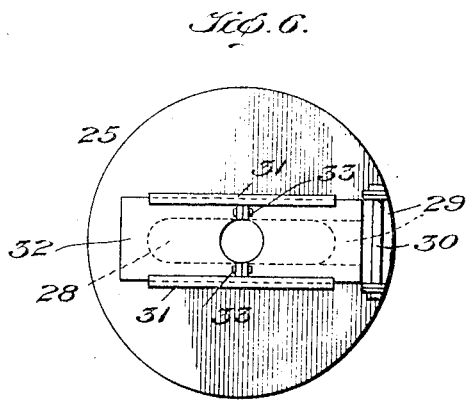
Witnesses
Inventor
Charles Henry Willard
By Harry N. Topp
His Attorney

UNITED STATES PATENT OFFICE.

CHARLES HENRY WILLARD, OF PASADENA, CALIFORNIA, ASSIGNOR OF ONE-HALF TO DORA ROWLEY, OF GILA BEND, ARIZONA.

AUTOMOBILE WHEEL AND AXLE.

1,034,378.

Specification of Letters Patent.   Patented July 30, 1912.

Application filed February 11, 1911. Serial No. 607,996.

*To all whom it may concern:*

Be it known that I, CHARLES H. WILLARD, a citizen of the United States, residing at Pasadena, county of Los Angeles, and State of California, have invented certain new and useful Improvements in Automobile Wheels and Axles, of which the following is a specification.

This invention relates to automobile wheels and axles.

The present invention has for its object the provision of an automobile wheel, more particularly an axle and spindle therefor, of novel construction, great strength, durability and simplicity, affording means whereby the wheel may readily turn in relation to its axle, dust will be excluded, easy assembly or taking apart of the parts may be had, the wheel be permitted to turn to a relatively great angle in relation to its axle to permit quick and short turning of the automobile; and, further, to dispose the friction brakes in a new manner, whereby double braking power may be most advantageously applied; to double the tractive surface and distribute all driving and brake power thereto; and still further, to connect the steering bars of the front and rear wheels of an automobile in a new manner, whereby all of the wheels may be simultaneously turned in relation to their axles with facility.

The invention is set forth fully hereinafter and the novel features are recited in the appended claims.

In the accompanying drawings:—Figure 1 is a plan view of an automobile chassis, showing the present invention applied to all wheels thereof and the new connection between the steering bars; Fig. 2, a section on line 2—2 of Fig. 4, looking in the direction of the arrow; Fig. 3, a similar view looking in the opposite direction; Fig. 4, a longitudinal section of one of the wheel hub and axle constructi .; Fig. 5, a detail view of the head on the end of the axle; and Fig. 6, a detail view of the guard or cap and dust slide.

The chassis 1 is preferably provided with cross me bers 2 for the convenient pivoting at 3 of a series of articulated levers 4, having slot and pin connections, one of which is operatively connected to the steering stem or head 5, the under levers of the series being pivoted to the steering bars 6 for the purpose of simultaneously turning all of the wheels 7, as will presently appear.

The front and rear axle hangers 8 and 9 are of the usual tubular form and contain the axles 10 and 11 which have suitable differential gears 12 in each instance and are provided with suitable ball bearings. On the ends of the axles 10 and 11, in each instance, there are substantially spherical heads or balls 13 which are provided with equatorially disposed slots or grooves 14 which widen at the ends and each of which extends laterally as distinguished from forwardly and rearwardly, being closed at both ends. The wheel hubs 15 and 16 are connected by bolts 17 so as to be separable, and in the outermost section there is a groove 18. Each of the sections has a semispherical cup 19 which receives the sphere or ball end 13 on the axle.

Secured between the sections of the hub are pins or members 20 which are received in the grooves 14 and are preferably provided with anti-friction rollers 21. Where the axle passes through the innermost hub section, there is a suitably large aperture 22 to allow for free play of the wheel up or down or at any desired angle laterally.

Secured to the axle hanger is a knuckle 23. Pivoted at 24 to the knuckle and received therein is a head or cap 25 which has a lateral slot 28, through which the axle loosely passes, allowing the wheel to turn freely, but holding it firmly in vertical position. Ball bearings are preferably interposed between the head or cap and the innermost hub section. The head or cap 25 is disposed a suitable distance away from the vertical parts of the knuckle so as to permit free shifting of the said head or cap during the steering operation and for the accommodation of the friction brake disk 27 which is secured to the axle, one of these brake disks being used on each of the axles, and the arrangement of the parts is such that the turning of the wheels will in no manner cause interference between the brake disks and the heads or caps.

The head or cap 25 has a lateral slot 28 and is preferably provided with a removable section 29 to facilitate repairs and attention to the ball bearings, and to secure the parts together there are provided detachable bolts 30 passing through ears. On the cap or head 25 there are lips or flanges 31 which guide a dust guard or slide 32 which is also made in detachable sections secured by bolts 33, facilitating detachment of the parts.

The steering bars 6 are connected to the ears 34 on the heads or caps 25 and the angle of these ears is such that in turning, the inside wheels will describe a smaller circle than the outside wheels. The disposition of the spherical ends on the axles and the hub construction are such that whatever the position of the wheel may be, the load is at all times at the center of the hub. The ends of the knuckle are received in the groove 18 and are thus housed and protected. The entire wheel, spherical axle end and axle rotate together, the hub and hence the wheel being adapted to assume different planes, due to the employment of the grooves 14 and the pins 20, so that the wheel accommodates itself to the surface over which it is traveling and also shifts as the automobile is turning a curve, and these functions are possible at all times, regardless of the angle to which the hub and the cap or head has been turned by the steering bar. Any suitable strap brake may be used in conjunction with each brake disk 27, and by the employment of a brake at or near the wheel, the braking efficiency is greatly heightened, making for safety in operation.

Having thus described my invention, what I claim as new and desire to secure by Letters Patent, is:—

1. In an automobile wheel and axle, the combination with an axle hanger, of an axle mounted therein, a knuckle secured to the axle hanger, a cylindrical hub cap to which the knuckle is pivoted, a wheel having a revoluble and pivotal connection with the axle and whose hub has a cylindrical part received in and having a rotatable connection with the cap, the cap being provided with a horizontal slot through which the axle passes and with horizontal guides flanking said slot, and a dust guard slidable horizontally in said guides and covering the slot aforesaid, said dust guard having an opening through which the axle relatively tightly passes.

2. In an automobile wheel and axle, the combination with an axle hanger, of an axle mounted therein, a knuckle secured to the axle hanger, a hub cap to which the knuckle is pivoted, a wheel having a revoluble and pivotal connection with the axle and whose hub has a rotatable connection with the cap, the cap having a horizontal slot through which the axle passes and which opens out through the periphery of the cap, a removable filling member for closing the open end of the slot, horizontal guides on the cap flanking the slot, and a vertically split dust guard slidable horizontally in said guides and adapted to cover the slot, the dust guard embracing the axle.

In testimony whereof, I hereunto affix my signature in presence of two witnesses.

CHARLES HENRY WILLARD.

Witnesses:
B. C. STRANG,
H. G. SIMPSON.